United States Patent Office 3,513,691
Patented May 26, 1970

3,513,691
HARDNESS TESTING MACHINES AND WEIGHT SELECTING MECHANISMS
William Charles Aston and George Hall, Birmingham, England, assignors to Imperial Metal Industries (Kynoch) Limited, Witton, Birmingham, England, a corporation of Great Britain
Filed Dec. 7, 1967, Ser. No. 688,754
Claims priority, application Great Britain, Dec. 20, 1966, 56,963/66
Int. Cl. G01n 3/32
U.S. Cl. 73—83                                    12 Claims

ABSTRACT OF THE DISCLOSURE

A weight selecting mechanism and hardness testing machine in which weights are selected to provide different loads for a metal indenter and the indenter may be positioned in any desirable position over a specimen to be tested to perform a hardness test.

BACKGROUND OF INVENTION

Field of invention

This invention relates to weight selecting mechanisms particularly, but not exclusively, for use in metal hardness testing machines.

Description of prior art

Hardness testing machines are known in which hardness of a metal specimen is determined by the cross-sectional area of an indentation formed in the specimen by a tip of a relatively hard indenter which is forced into the surface of the specimen under load. It is a simple operation to position the indenter relative to the specimen prior to a hardness test and also to adjust the load upon the indenter when metal hardness is to be tested at ambient temperature in atmospheric conditions.

However, it is sometimes desirable to be able to determine the hardness of certain metals, such as tungsten, at relatively high temperatures, for instance, above 1200° C. To be able to perform hardness tests under such temperature conditions, it is desirable that during the test, the metal specimen and at least parts of apparatus adjacent the specimen are in a substantial vacuum, to prevent oxidation of the specimen and/or of the apparatus. A container is, therefore, required for this purpose. Because of the use of such a container, loads applied to the indenter have previously been applied either from an external source through a system of levers passing through seals to the indenter, or by air pressure through a bellows. These methods of load application are suspect in that friction of moving parts and resistance to movement of the bellows makes it difficult to apply a specific load to the indenter. Also, it may be necessary to adjust loads applied to a specimen which is held in a closed container for other reasons such as, for instance, if the specimen is radioactive or requires to be enclosed by a gaseous medium.

SUMMARY OF INVENTION

An object of the present invention is to provide a weight selecting mechanism which may be located within a closed container such as may be used for a hardness testing machine, for applying and adjusting weights.

According to one aspect of the present invention, a weight selecting mechanism comprises a group of latches disposed in angular relationship to one another around an axis, a plurality of weights located or locatable in a stack extending axially of the mechanism, the weights in the group of latches being disposed one radially within the other relative to the axis and the latches being movable radially of the axis into and out of support positions in which a support surface of each latch is in a position to support at least one weight of the stack when located on a first axial side of and upon said surface, and a weight-carrying member for supporting weights of the stack, the weight-carrying member and group of latches being relatively movable axially in both directions, each weight having a surface which, when the weight is supported by the member on a second axial side of the support surfaces and during relative movement of the member and latches in one direction to bring the member towards the support surfaces, actuates the latches upon reaching a predetermined position to move the latches radially out of their support positions to allow the weight to move past the support surfaces to the first axial side, the latches then being returnable to their support positions so as to support the weight and thereby remove it from the weight-carrying member.

It is preferable that the latches extend axially of the mechanism and are pivotably movable about an axis at a position spaced from their support surfaces to allow for their pivotal movement radially into and out of their support positoins.

Preferably, during relative movement of the weight-carrying member and latches in said one direction and at a first predetermined position of the member relative to the latches, the latches are caused to move radially from their support positions to withdrawn positions so that any weight supported upon the support surfaces is transferred to the member, retaining means being provided for retaining the latches in their withdrawn positions to allow the weight to move to the second axial side of the support surfaces during a succeeding relative movement of the member and latches in the opposite direction, and the latches are caused to return to their support positions at a second predetermined position of the member relative to the latches during said movement in the opposite direction.

In the mechanism, it is preferable that the weights are annular and the latches are disposed radially within the weights.

The invention also includes a hardness testing machine comprising a horizontal surface for supporting a specimen to be hardness tested, a structure for holding an indenter in a position above said surface, said structure being operable to move an indenter towards and away from the horizontal surface, and a weight selecting mechanism as defined according to the invention above.

It is also preferable that the weight-carrying member is secured to the structure so that weights apply a load to the structure when they are supported by the weight-carrying member. Normally, the member is supported for vertical movement by a platen and may be lowered to a weight-applying position in which, when an indenter is held by the structure, the indenters structure, the weights and weight selecting member are supported by a specimen, and guide surfaces are provided to maintain the weight-carrying member coaxial with the axis of the mechanism at least during movement of said member away from the weight applying position.

It is preferable that the guide surfaces are surfaces of guide strips disposed in spaced positions around and projecting from the outer peripheral surface of a support tube. Further, the guide strips may have lower ends which terminate above the weight applying position and the strips may be tapered towards their lower ends when considered in the radial direction of the tube. Alternatively, the guide surfaces may be surfaces of guide rods of circular cross-section fitted into partly circular grooves extending axially of the tube and projecting from the outer tube surface.

According to a further aspect of the invention a hardness testing machine comprises a horizontal support surface for supporting a specimen, a structure for holding an indenter above said surface, the structure and horizontal surface being relatively movable to locate the indenter vertically above any one position on said surface, and indicating means to show the relative positions of the indenter and surface at any instant and for locating the indenter vertically above any desired position on the surface after relative movement between the structure and the surface.

In one construction the structure and horizontal support surface are relatively movable by means of a rod which is capable of movement in any direction in a plane normal to its length to impart relative movement in any direction between the structure and surface, the indicating means comprising an indicating arm and an indicating surface, one of which is attached to the arm, for their relative movement during movement of the rod whereby the position of the arm in relation to the indicating surface corresponds at any instant to the position of the indenter above the horizontal support surface.

BRIEF DESCRIPTION OF DRAWINGS

One embodiment of the invention will now be described, by way of example, with reference to the accompanying drawings in which.

DESCRIPTION OF PREFERRED EMBODIMENT

Figure 1:
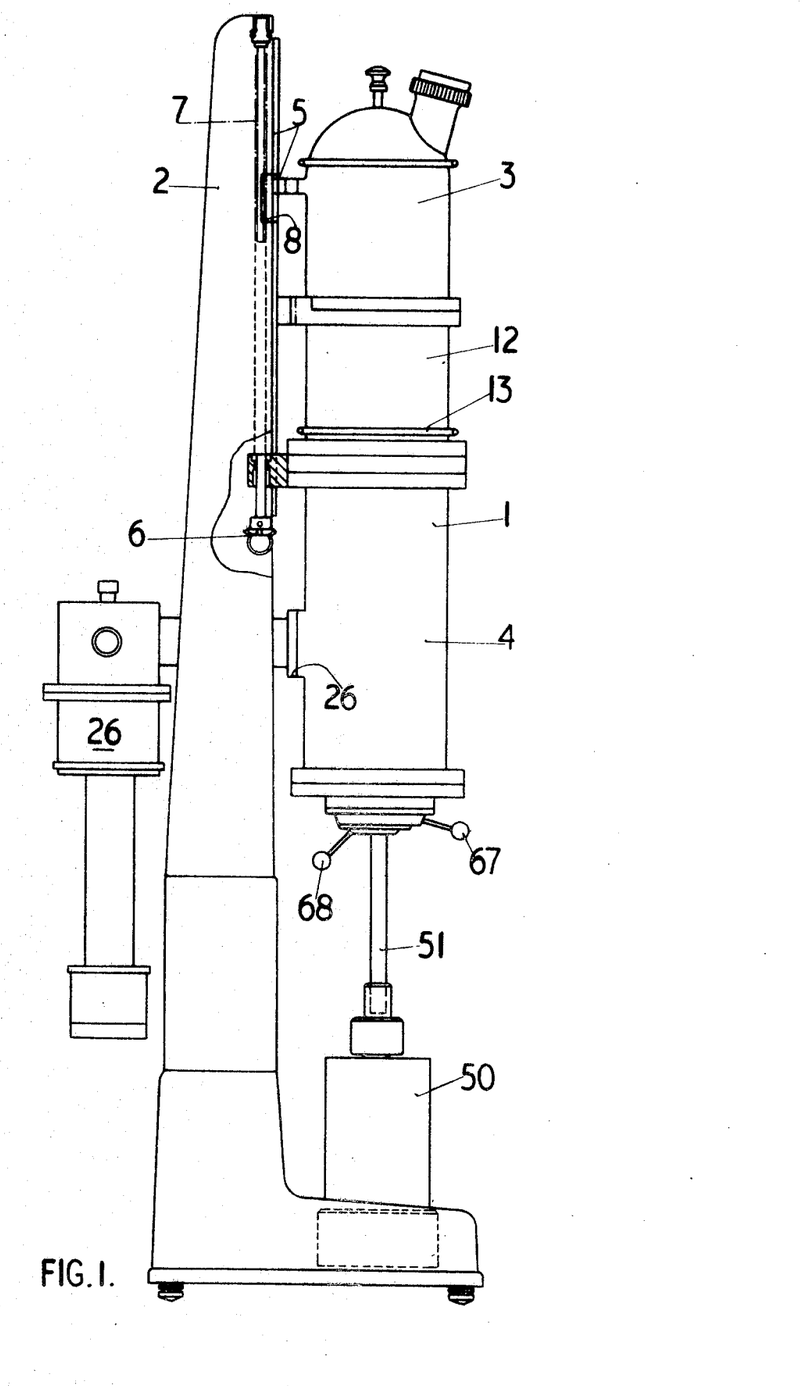
FIG. 1 is a side elevational view of a hardness testing machine mounted upon a frame.
Figure 2A:
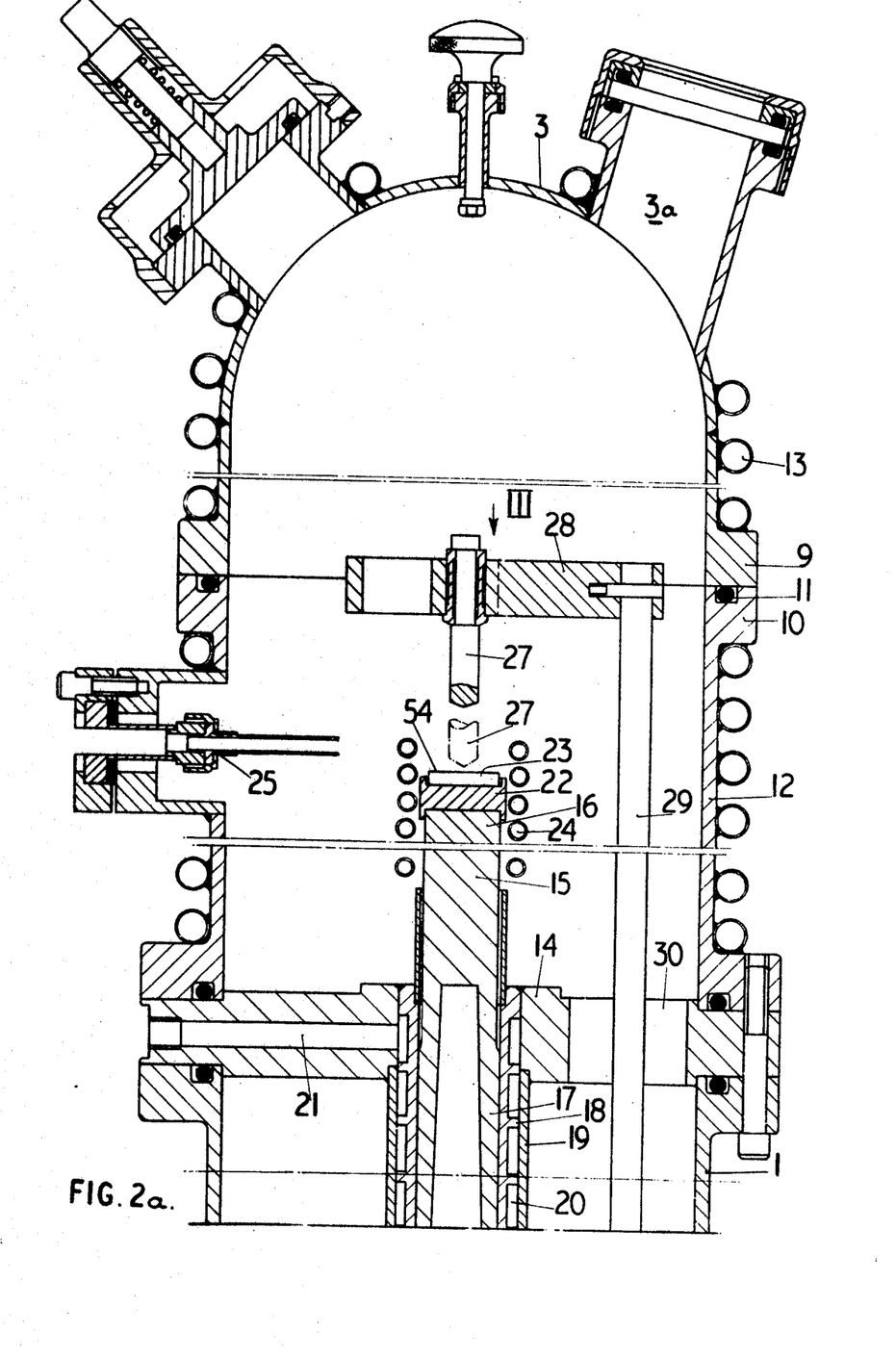
FIGS. 2a and 2b are sections through upper and lower parts of the machine showing it on a larger scale than in FIG. 1.
Figure 2B:
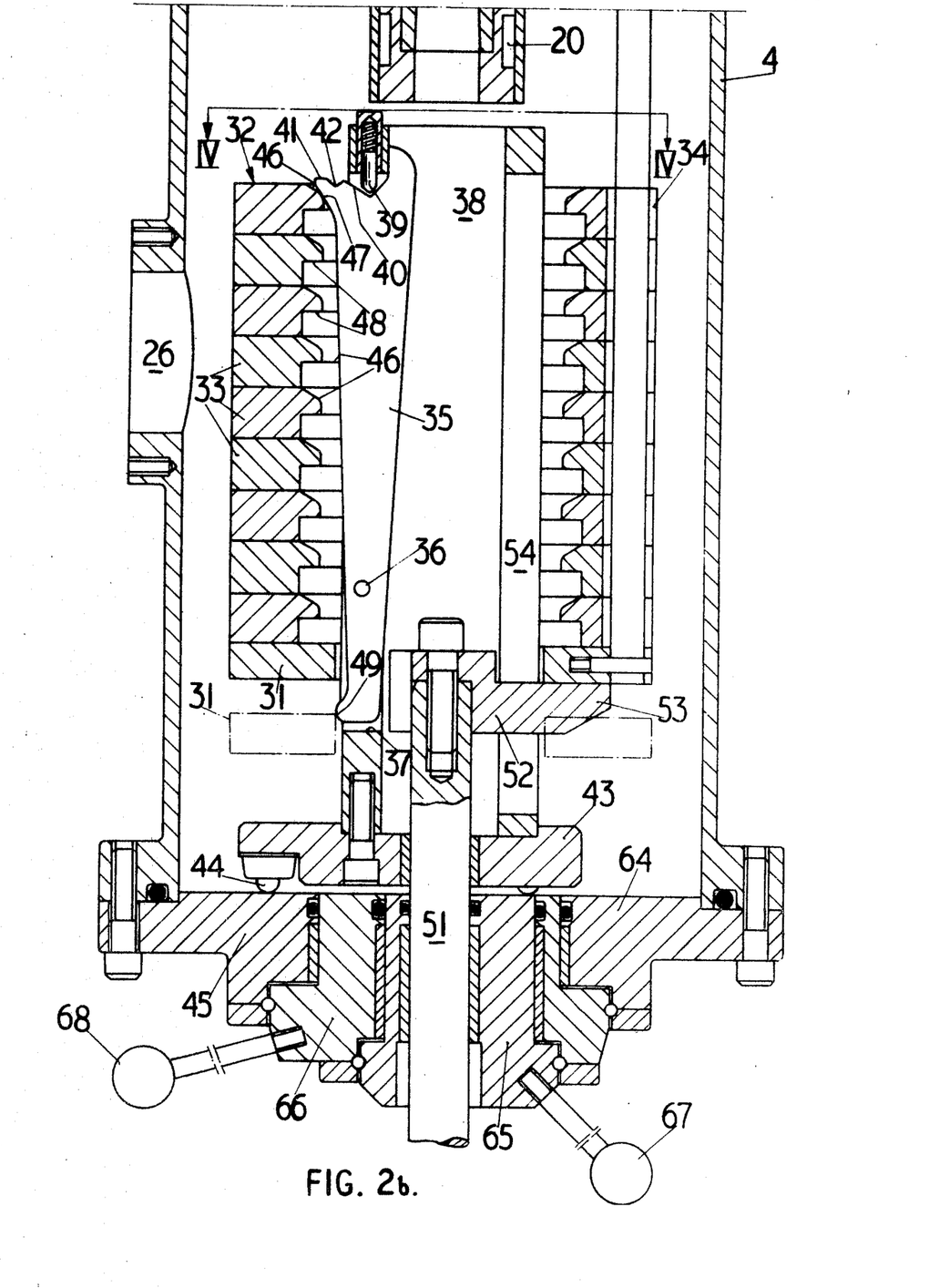

With initial reference to FIGS. 1 and 2, a metal hardness testing machine for testing the hardness of metals at temperatures above 1200° C. comprises a cylindrical stainless steel hermetically sealed container 1 supported by a frame 2 in a vertical position. A domed upper portion 3 of the container is detachable from a lower portion 4 to allow for the positioning of a specimen to be tested within the container. The domed upper portion is vertically slidably mounted upon the frame by a guide means 5 of known form and a manually operable gear assembly 6 mounted upon the frame is provided to rotate a screw-threaded shaft 7 engaged with a halfnut 8 mounted upon the upper portion to move it towards and away from the lower portion. When the upper portion is in a position lowered onto the lower portion, end flanges 9 and 10 of the portions are mutually engaged (FIG. 2a) and a rubber seal 11 seals the inside of the container from ambient atmosphere. The upper portion and upper regions 12 of the lower portion of the container are surrounded by tubing 13 for containing water coolant during use.

Within the container (FIG. 2), a stainless steel anvil support 14 extends horizontally across the container in a fixed position partly along the lower container portion. The anvil support holds a cylindrical tungsten anvil 15 in a fixed position coaxially with the container, the anvil having upper and lower parts 16 and 17 extending, respectively, above and below the anvil support. The lower part of the anvil (FIG. 2b) is coaxially surrounded by two metal sleeves 18 and 19 disposed one radially within the other. The two metal sleeves define between them spiral passageways 20 extending along the sleeves from the anvil support, an entry and exit to the passageways being connected to entry and exit passageways 21 which extend radially through the support and are connected to a source of pumped coolant water (not shown) for ensuring continuous flow of coolant water through the spiral passageways during hardness testing of a metal specimen.

The upper part of the anvil lies in the upper regions of the lower portion of the container and is capped by a tungsten pad 22 having a circular recess in its upper surface for containing a metal specimen to be tested, a horizontal base surface 23 of the recess being provided to support the specimen.

Immediately coaxially surrounding the tungsten pad is a spiral induction heating coil 24 which is connected by two connections 25 in the wall of the container to an induction heating unit of known construction. The coil is capable of heating the tungsten pad and a metal specimen to at least a temperature of 2000° C. The temperature of the specimen during a metal hardness test is measured optically in known manner through an observation port 3a, provided in the dome of the upper portion of the container and the temperature of the specimen is controllable in known manner.

Because the machine is to be used to test metal hardnesses at elevated temperatures, then to prevent or restrict oxidation of a metal specimen and parts of the machine enclosed within the container, it is necessary to create substantial vacuum conditions within the container. To this end, a port 26 provided in the lower portion of the container is connectable to a means 26a (FIG. 1) for creating a vacuum.

Located directly above the horizontal base surface of the recess of the tungsten pad is an indenter 27 which is formed at its lower end with a pyramidical shape known as the Vickers pyramid. The indenter is of the construction described in the complete specification of our co-pending patent application No. 56962/66 and material forming a tip of the pyramid is 100% tantalum carbide which is secured to a main body of the indenter which is tungsten hot pressed around the tantalum carbide.

Figure 3:
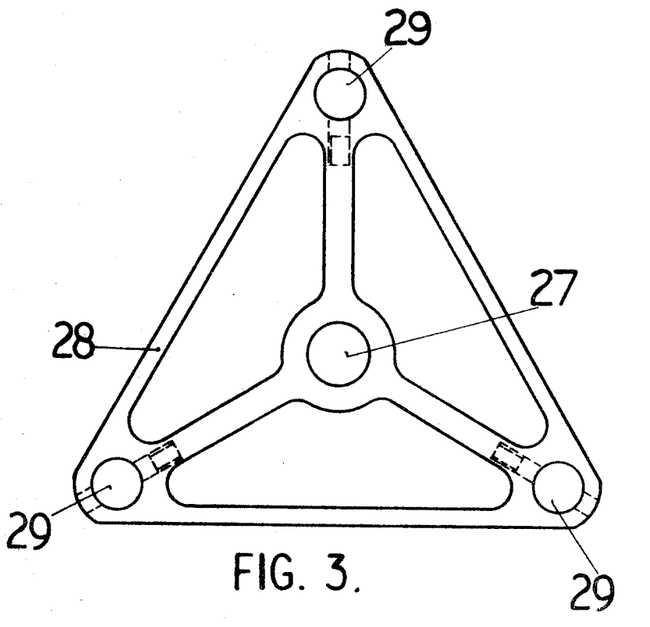
FIG. 3 is a view on arrow III in FIG. 2a of part of the machine.

The indenter is suspended by its upper end from a triangular niobium plate 28 (see particularly FIG. 3), the indenter being located centrally of the plate when considered in plan view with the plate lying in a plane normal to the contanier axis. The triangular plate is a part of a structure for holding the indenter, the structure also comprising three niobium tubes 29 which are secured adjacent the corners of the plate. As shown in FIG. 2 in which one tube only is shown, the three tubes extend vertically downwards from the plate, through clearance holes 30 in the anvil support and terminate towards the lower end of the container.

The lower ends of the tubes are secured to a circular annular weight-carrying member 31 of a weight selecting mechanism 32 by which numbers of weights may be selected for support by the member to provide a load for the indenter. The weight-carrying member is coaxial with an axis of the mechanism which extends axially of the container. A plurality of circular annular weights 33 are disposed, one above another, in the form of a stack upon the weight-carrying member, each weight being formed with three peripheral recesses 34 which partly extend around and clear the niobium tubes. Adjacent weights are located in relative positions by spigots and recesses (not shown). A group of latches 35 (one only being shown in FIG. 2b, but see FIG. 4) are disposed in angular relationship to one another around the axis of the mechanism and radially within the weights. The latches extend axially of the mechanism and are pivotally mounted towards their lower ends by means of pins 36 within axially extending slots 37 of a latch support tube 38 to allow for pivotal movement of the latches within the slots in a radial direction relative to the axis of the assembly. Each latch is pivotally movable into and out of a weight support position (shown in FIGS. 2b and 4) in which the upper end of each latch lies at a radial outer limiting location relative to the axis of the mechanism and is normally held in this position by a resilient means. This resilient means comprises, in respect of each latch, a spring loaded plunger 39 mounted within the upper end of the metal tube with the plunger extending into the upper end of its associated metal tube slot for engagement with a first notch 40 provided in an upwardly directed surface 41 within the upper end of the latch. This upwardly directed surface is a support surface for weights from the stack when these are disposed above the surface and when the latch is in its weight support position. A second notch 42 in the support surface of each latch, which is spaced radially outwards from the first notch is provided to be engaged by the spring-loaded plunger when the latch is disposed in a radially inner withdrawn position in which weights are allowed to pass axially of the support surface as will be described.

The metal tube, and thus the latches, is supported at its base upon a metal plate 43 which is movably supported by ball bearings 44 upon a base 45 of the container for a purpose to be described.

Figure 6:
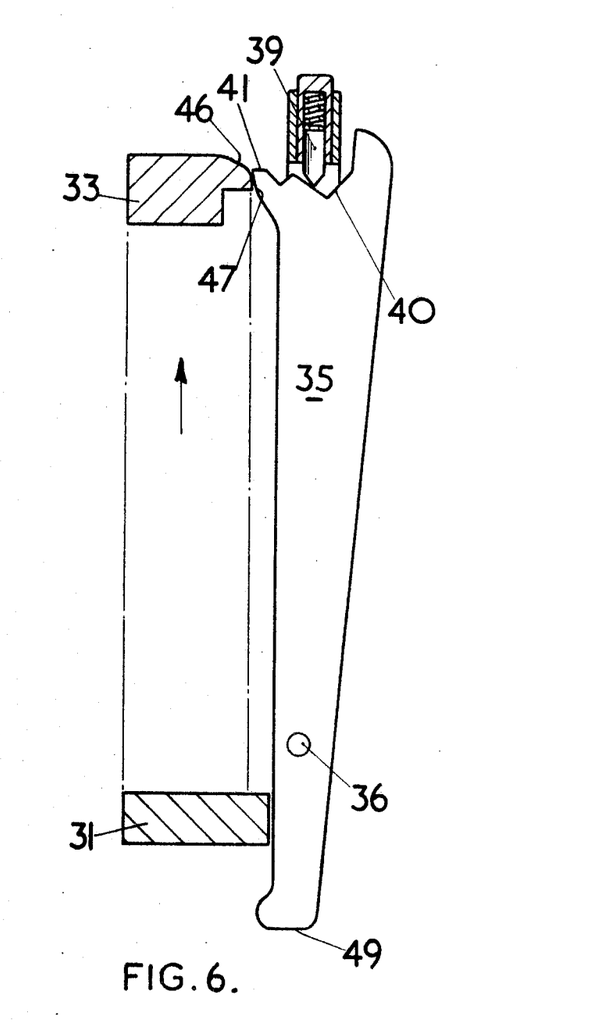
FIGS. 6 to 8 inclusive are semi-diagrammatic axial cross-sectional views of part of the weight selecting mechanism showing its method of operation.
Figure 7:
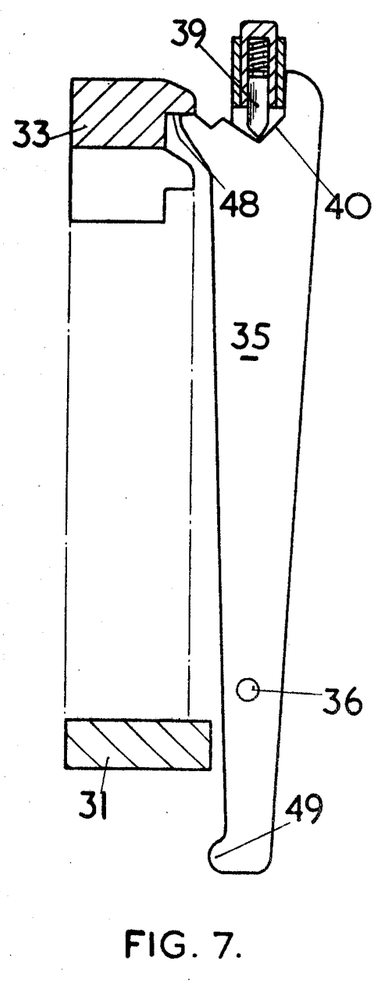

The weight-carrying member and thus the structure and indenter is movable vertically within the container and relative to the latches. In a lower position of the member, if all the weights are carried by the member, then the topmost weight lies below the level of the support surfaces of the latches. Each weight is formed with a radially inwardly directed upper surface 46, which, when the weight is being raised by the weight-carrying member, and upon reaching a predetermined position, engages a radially outwardly directed projection 47 of each latch to cause the latch pivotally to move radially inwards out of its support position as shown in FIG. 6 during continued raising of the weight. In FIG. 2b, the uppermost weight is shown in this predetermined position. This movement of the latches allows the weight to pass axially beyond and above the level of the support surface. Each weight is also formed with an annular recess at its lower radially innermost regions to provide a downwardly directed surface 48 for engagement with the support surfaces of the latches when they are in their support positions as shown in FIG. 7. As the downwardly directed surface of each weight passes upwardly beyond the support surface of the latches, the latches are allowed to return to their support positions under the influence of the spring-loaded plungers because of their action against a side of each notch 40 within which they still lie (see FIG. 6) when a weight passes the surface. The number of weights desired to be positioned above the surfaces is determined by the position to which the weight-carrying member is raised during any one movement. Upon return movement of the member towards its original lower position, all of the weights at that time located above the latch support surfaces are supported by the support surfaces and are thereby removed from the weight-carrying member.

Figure 8:
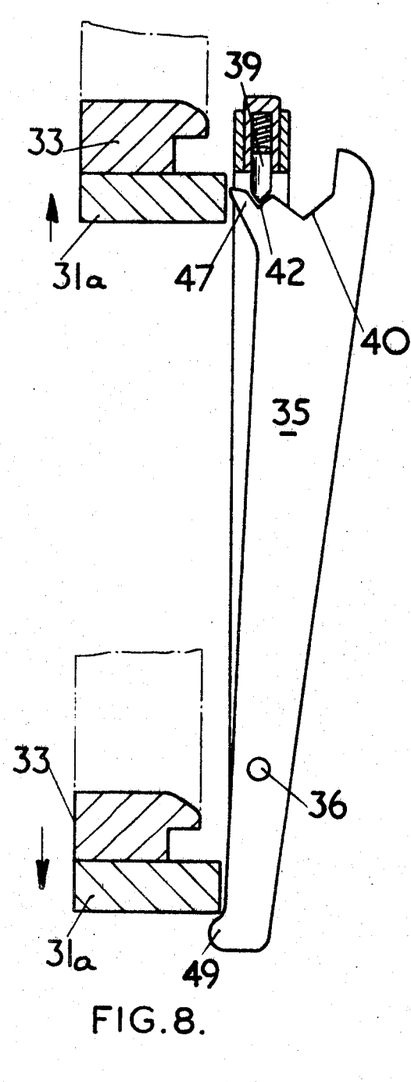

If it is desiretd to return a weight or weights from the support surfaces to the weight-carrying member, it is necessary initially to return all of the weights to the member and then return some of these to the latch support surfaces. To return the weights to the weight-carrying member, the member is raised upwards to an upper predetermined position in which it engages the projections 47 of the latches. The inner diameter of the weight-carrying member is less than that of each of the weights so that during continued upward movement of the member from this position to an uppermost position (designated 31a in FIG. 8) the latches are caused to move, because of their engagement by the member, radially inwards to their wtihdrawn positions as shown in FIG. 8 in which they are held by the spring-loaded plungers 39 engaging the notches 42 of the latches. In this position of the latches, they lie completely radially within the weights so that the support for the weights is transferred from the latches to the weight-carrying member. Upon downward movement of the member, the weights are carried downwardly below the latch support surfaces. When all the weights lie below the latch support surfaces, the member 31 reaches a lower predetermined poition (designated 31b in FIG. 8) in which it engages another projection 49 on each of the latches (see FIG. 8), positioned below the pivotal axes of the latches, to force the lower ends of the latches radially inwards and thus their upper ends radially outwards during continued downward movement of member 31 so that the spring-loaded plunger engages the notches 40 of the latches to hold them in their support positions.

Figure 9:
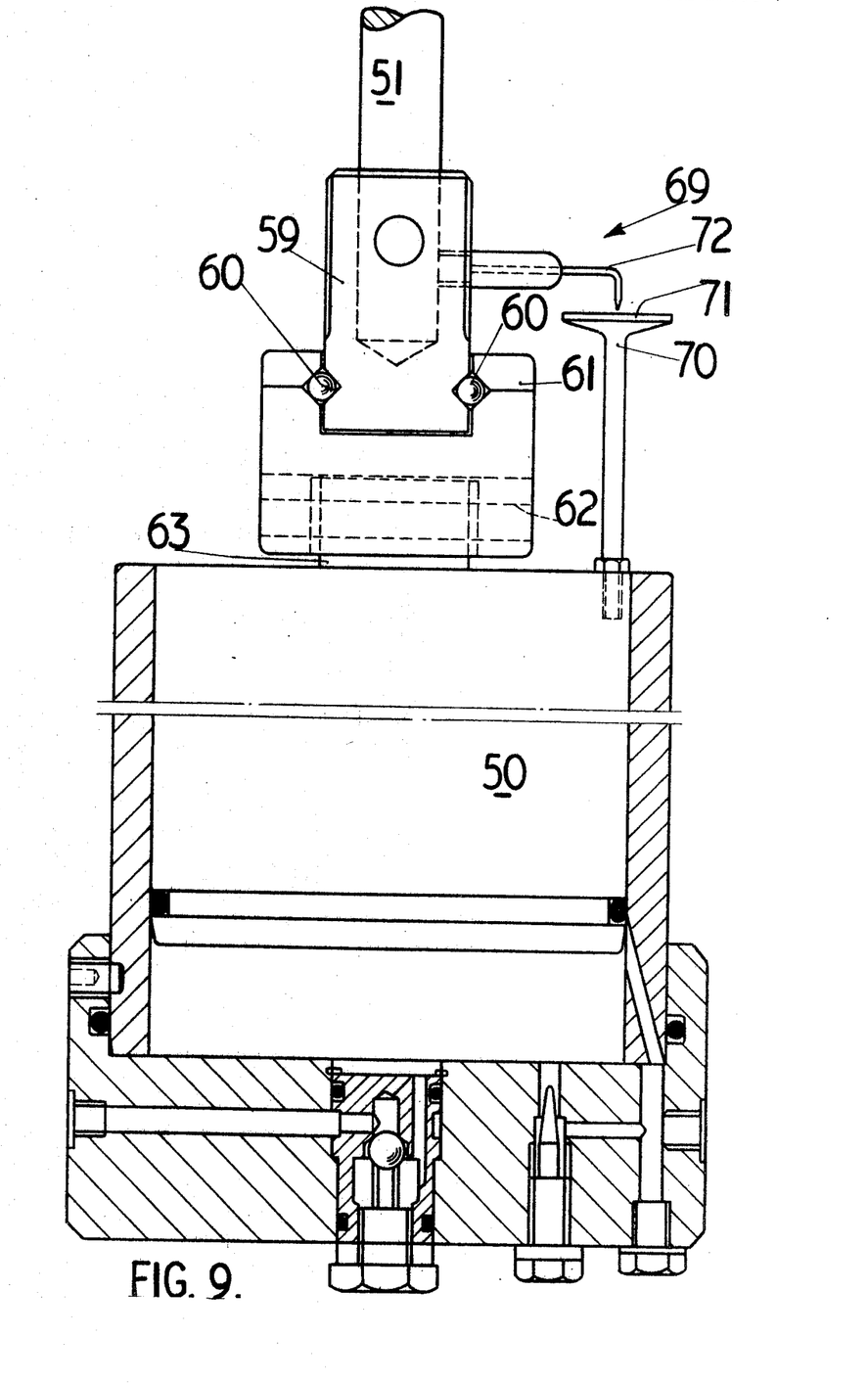
FIG. 9 is a view on the same scale as FIGS. 2a and 2b of a jack and cylinder assembly for operating the weight selecting mechanism.

Means are provided for moving the weight-carrying member vertically relative to the latches. This means comprises a fluid operated jack and cylinder assembly 50 (FIGS. 1 and 9) located below the container with the piston rod 51 extending in air-tight axial sliding engagement through the base of the container and carrying at its upper end a platen 52 (FIG. 2b) which supports the weight-carrying member 31 by means of platen arms 53 extending through slots 54 in the tube 38.

Figures 4, 5:
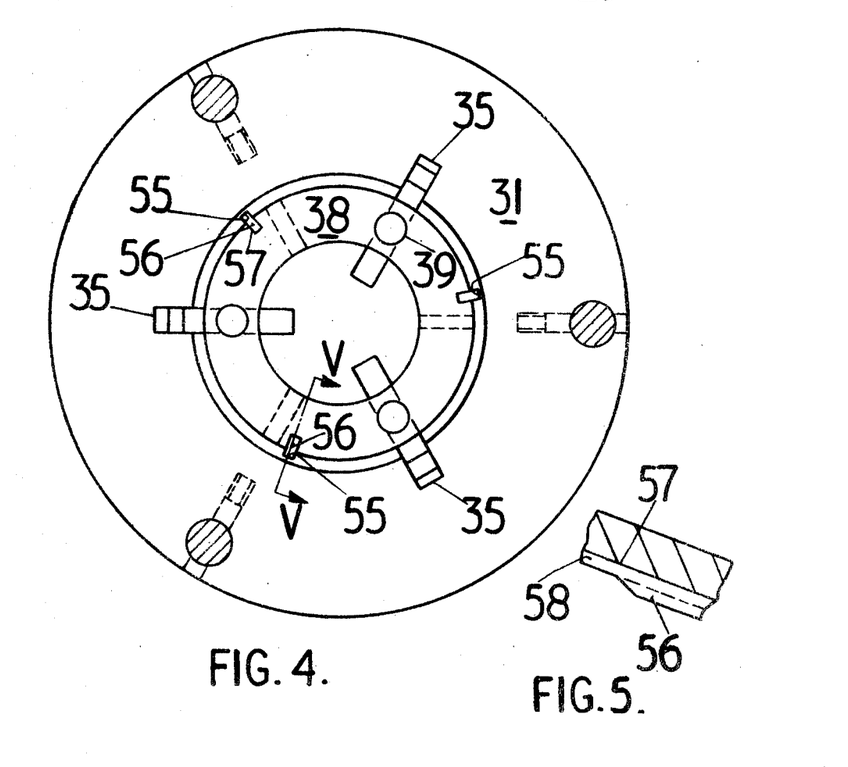
FIG. 4 is a cross-sectional view along line IV—IV in FIG. 2b showing a part of a weight selecting mechanism of the machine with weights removed.
FIG. 5 is a cross-sectional view along line V—V in FIG. 4 of part of the mechanism.

The assembly 50 is actuable to lower the member 31 and thus a required number of weights and the indenter to a weight applying position (shown in chain-dotted outline for the member 31 and indenter in FIG. 2b). Under the action of assembly 50 the platen may then be withdrawn to leave the total weight of indenter, structure, weights and member 31 carried by a tungsten specimen 54 when this is located upon the pad 22. To ensure that the member 31 is coaxial with the tube 38 when it is again moved upwards, guide surfaces are provided to maintain the member 31 coaxial with the tube 38. These surfaces are the radially outer surfaces 55 (FIGS. 4 and 5) of guide strips 56 located in grooves 57 of the tube. The guide strip surfaces 55 are of convex section with a radius less than that of the inner radius of member 31 and project equal distances from the tube with the member 31 a sliding fit around surfaces 55. As shown in FIG. 5 the guide strips are tapered towards their lower ends 58 and terminate short of the upper surface of the member 31 when it occupies its weight-applying position.

The piston rod is movable in any direction radially relative to the axis of the container so as to move the weight selecting mechanism 32, structure, and indenter 27 also in a radial direction within the container to locate the indenter above any one of an indefinite number of positions of the horizontal base surface 23 of the tungsten pad. The rod is movable partly because its lower end 59 (FIG. 9) is slidably movable in two directions at right angles to one another relative to the jack. This is achieved by the provision of two rows of balls 60 partly retained in opposed grooves in the sides of a recess of a metal block 61 and partly retained in grooves at the lower end of the rod which is received within the recess to allow movement of the piston rod in one direction, and two rows of balls 62 extending in a direction normal to the two rows of balls 60 and located to provide a guide between the block and the jack 63 of the assembly to allow movement of the piston rod in the other direction. As shown in FIG. 2b, the rod is also movable in the above manner because the base of the container through which the rod passes comprises an annular base plate 64 secured to the walls of the container and two eccentric bearings 65 and 66 rotatably mounted one within the other within the base plate, the two bearings encircling the piston rod. The eccentric bearings are manually rotatable by means of outwardly extending handles 67 and 68 and the position of the piston rod and indenter radially of the axis of the container is determined by the relative rotational positions of the bearings an their positions relative to the base plate.

Indicating means 69 (FIG. 9) are provided for showing the position of the indenter relative to the horizontal base surface of the tungsten pad at any instant, and for correctly locating the indenter vertically above any desired position of the surface. This means comprises a surface indicating member 70 secured to the upper end of the jack. This indicating member has a circular upper indicating surface 71 of equal diameter to that of the horizontal base surface of the tungsten pad. An indicating arm 72 secured to the piston rod 51 extends across the surface with a downwardly depending pointed end of the arm located vertically above a position on the surface. During movement of the piston rod relative to the jack and axis of the container, the arm 72 moves relative to the indicating surface to move the pointed end across the surface. The arm is located in a position such that its pointed end is disposed vertically above the centre of radius of the indicating surface when the indenter is coaxially located within the container and lies vertically above the centre of the horizontal base surface of the tungsten pad. Further, any movement of the indenter across the horizontal base surface is accompanied by corresponding movement of the pointed end of the arm over the indicating surface. The indenter may, therefore, be located over a desired position of the horizontal base surface without opening the container by moving the piston rod to locate the pointed end of the arm over a corresponding position of the indicating surface.

In use of the machine, the weights are initially all supported in the stack by the weight-carrying member 31 which is located by the jack and cylinder assembly in its full outline position shown in FIG. 2b. The upper portion of the container is raised vertically away from the lower portion to allow the tungsten specimen 54 to be located within the container for hardness testing.

The tungsten specimen is a flat circular disc with a diameter sufficient for it to be located snugly within the recess of the tungsten pad and supported by the horizontal base surface.

After the specimen is located in position, the upper portion 3 of the container is brought downwards and is hermetically sealed with the lower portion. Vacuum is then created within the container by connection of the port 26 to the vacuum source and while the specimen, tungsten pad, and the upper part of the anvil are heated by the induction coil, coolant water is passed through a central bore of the coil in known manner and also through the spiral passageways around the lower part of the anvil to prevent the temperature in part of the container below the anvil support increasing to that above the anvil support to protect the rubber sealing rings. Coolant water is also passed around the tubes on the outside of the container.

When the temperature of the specimen has reached 2000° C. determined optically through the observation port 3a, the temperature is held at this temperature in known manner. For a full load test, the piston rod is then lowered gradually to lower the weight-carrying member, weights and indenter to the weight applying position in which the indenter is located with its tip in engagement with the upper surface of the specimen. The position of engagement is determined by the location of the pointed end of the arm over the indicating surface as described above. The jack together with its platen is then withdrawn to leave the specimen supporting a statically applied load which is the summation of the loads applied by the weights themselves, the weight-carrying member, structure and indenter. This load causes the tip of the indenter to penetrate the specimen to a depth dependent upon the hardness of the specimen at the temperature to which it has been raised. The piston and cylinder assembly is then actuated to raise the indenter.

If it then is desired to test the hardness of the specimen at a different temperature or under a different load or both, the piston rod and thus the indenter are moved radially of the container axis to locate the indenter over another position of the specimen, the weight selecting mechanism, structure and indenter being carried over the base of the container upon the ball bearing. As the new position of the indenter is known and chosen by reference to the indicating means, the need to open the container is avoided. Further, the load upon the intenter may be altered without opening the container. The load is initially lessened by removing a weight or weights from the weight-carrying member by moving the member upwards, as described above with reference to FIGS. 6 and 7, to cause the weight or weights to be moved axially past the support surfaces of the latches and then to be supported by these surfaces upon downward movement of the member. During this upward movement of the member 31, if for any reason it was not maintained coaxial with the tube 38 in the weight applying position, then the tapered ends of the guide strips 56 re-locate the member into a coaxial position. Further, after a weight or weights has been removed from the weight-carrying member, it may be returned thereto to increase the load upon the indenter, as described above with reference to FIG. 8, by moving the latches to their radially inner positions by co-action with the member so as to allow the weight or weights to return to the member.

With the above machine, therefore, a single specimen may be hardness tested for a range of temperatures and for a range of loads, and individual spaced-apart indentations my be provided in the specimen for different temperatures and/or loads without it being required to open the container. Further, because the indenter may be moved relative to the specimen for performing a series of tests, only one specimen is required to give a complete range of results.

A further advantage is that in use of the apparatus, the weights upon the weight-carrying member apply a "dead weight," which is devoid of frictional errors, to the indenter as the whole load is taken directly downwardly through the indenter and there is no frictional engagement between any part of the structuer, weights, or weight-carrying member, and other parts of the apparatus.

In a modification of the above described construction, the induction heating coil is replaced by a resistance wound tube furnace to cater for lower temperature hardness testing ranges below 1200° C.

We claim:

1. A weight selecting mechanism having a plurailty of weights which are selectable wherein in the improvement the mechanism has an axis and comprises a group of latches disposed in angular relationship to one another around the axis, the weights being located in a stack extending axially of the mechanism with the weights and group of latches being disposed one radially within the other relative to the axis and with the latches being movable radially into and out of support position in which each latch has a support surface in a position to support at least one weight of the stack when the weight is located upon one axial side of and upon said surface, and a weight-carrying member for supporting weights of the stack, the wieght carrying member and group of latches being relatively movable axially in both directions, each weight having a surface which, when the weight is supported by the member on a second axial side of the support surfaces and during relative movement of the member and latches in one direction to bring the member towards the support surfaces, actuates the latches upon the weight reaching a predetermined position to move the latches radially out of their support positions to allow the weight to move past the support surfaces to the first axial side, the latches then being returnable to their support positions so as to support the weight and thereby remove it from the weight-carrying member and wherein during relative movement of the weight-carrying member and latches in said one direction and at a first predetermined position of the weight-carrying member relative to the latches, the latches are caused to move radially from their support positions to withdrawn positions so that any weight supported upon the support surface is transferred to the member, retaining means being provided for retaining the latches in their withdrawn positions to allow the weight to move to the second axial side of the support surfaces during a succeeding relative movement of the member and latches in the opposite direction, and the latches are caused to return to their support positions at a second predetermined position of the member relative to the latches during said movement in the opposite direction.

2. A mechanism according to claim 1 wherein the latches extend axially of the mechanism and are pivotally movable about an axis at a position spaced from their support surfaces to allow for their pivotal movement radially into and out of their support positions.

3. A mechanism according to claim 2 wherein in the second predetermined position of the weight-carrying member, all of the weights are located on the second axial side of the support surfaces before the latches are caused to return to their support positions.

4. A mechanism according to claim 2 wherein each latch is provided with two axially-spaced projections, and the weight-carrying member engages a first of the projections during relative movement of member and latches in said one direction to cause each latch to move to its withdrawn position, and during relative movemetn in the opposite direction the member engages a second of said projections on each latch pivotally to return said latch to its support position.

5. A mechanism according to claim 2 wherein resilient means are provided to return the latches to their support positions after movement of each weight to the first axial side of the support surface.

6. A mechanism according to claim 5 wherein each latch is provided with first and second spaced notches and the resilient means for each latch is a spring-loaded plunger locatable within the first notch normally to retain the latch in its support position and which urges the latch to return to its support position after movement of each weight to the first axial side of the support surfaces, movement of the latch to the withdrawn position effecting removal of the plunger from the first notch and locating it within the second to retain the latch in said position until it is caused to return to its support position.

7. A mechanism according to claim 2 wherein the weights are annular in shape and the latches are disposed radially within the weights.

8. A hardness testing machine comprising a horizontal surface for supporting a specimen to be hardness tested, a structure for holding an indenter in a position above said surface, said structure being operable to move the indenter towards and away from the horizontal surface, and a weight selecting mechanism according to claim 2 wherein the weight-carrying member is secured to the structure so that weights apply a load to the structure when they are supported by the weight-carrying member, the machine further comprising a platen for normally supporting the weight-carrying member for vertical movement towards and away from a weight-applying position, guide surfaces associated with the mechanism being provided to maintain the weight-carrying member coaxial with the axis of the mechanism at least during movement of said member away from the weight-applying position, said guide surfaces being surfaces of guide strips disposed in spaced positions around and projecting from the outer peripheral surface of a support tube.

9. A machine according to claim 8 wherein the guide strips have lower ends which terminate above the weight applying position of the weight-applying member.

10. A machine according to claim 9 wherein the guide strips are tapered towards their lower ends when considered in the radial direction of the tube.

11. A hardness testing machine comprising a horizontal support surface for supporting a specimen, a structure for holding an indenter above said surface, the structure and horizontal surface being relatively movable to locate the indenter vertically above any one position on said surface, the structure and horizontal support surface being relatively movable by means of a rod secured to the structure, the rod being capable of movement in any direction in a plane normal to its length to impart relative movement in any direction between the structure and surface, a indicating means comprising an indicating arm and an indicating surface one of which is attached to the rod for their relative movement during movement of the rod whereby the position of the arm in relation to the indicating surface corresponds at any instant to the position of the indenter above the horizontal support surface.

12. A machine according to claim 11 wherein the horizontal support surface and the structure are enclosed within an air-tight container and the rod etxends into the container through a part of the container, the rod being received through two eccentric bearings, one rotatably mounted within the other and located in said part of the container, to allow for movement of the rod in any direction in a plane normal to its length.

References Cited

UNITED STATES PATENTS

| | | | |
|---|---|---|---|
| 1,125,874 | 1/1915 | Osgood | 177—204 |
| 1,634,444 | 7/1927 | Benton | 177—204 |
| 2,938,377 | 5/1960 | Sklar | 73—83 |
| 3,221,535 | 12/1965 | Ohishi | 73—15.4 |

FOREIGN PATENTS 927,141  5/1963  Great Britain.

OTHER REFERENCES

ORNL–3448, Hallerman and Gray, July 1963, pp. 8, 9, 11, 14, 15, Oak Ridge National Laboratory publication on "Equipment For Hardness Testing at Elevated Temperature."

RICHARD C. QUEISSER, Primary Examiner

ELLIS J. KOCH, Assistant Examiner